No. 756,865. Patented April 12, 1904.

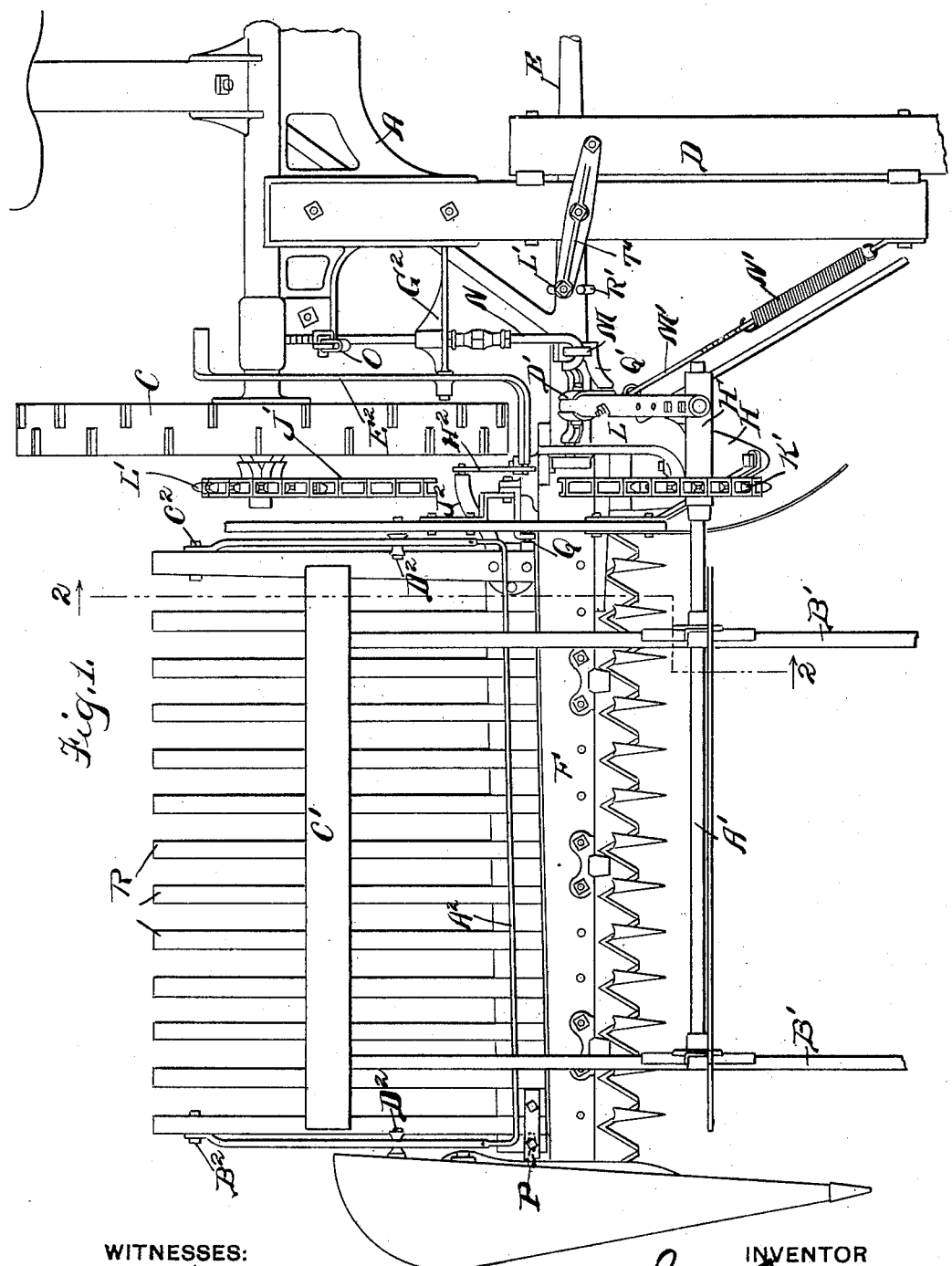

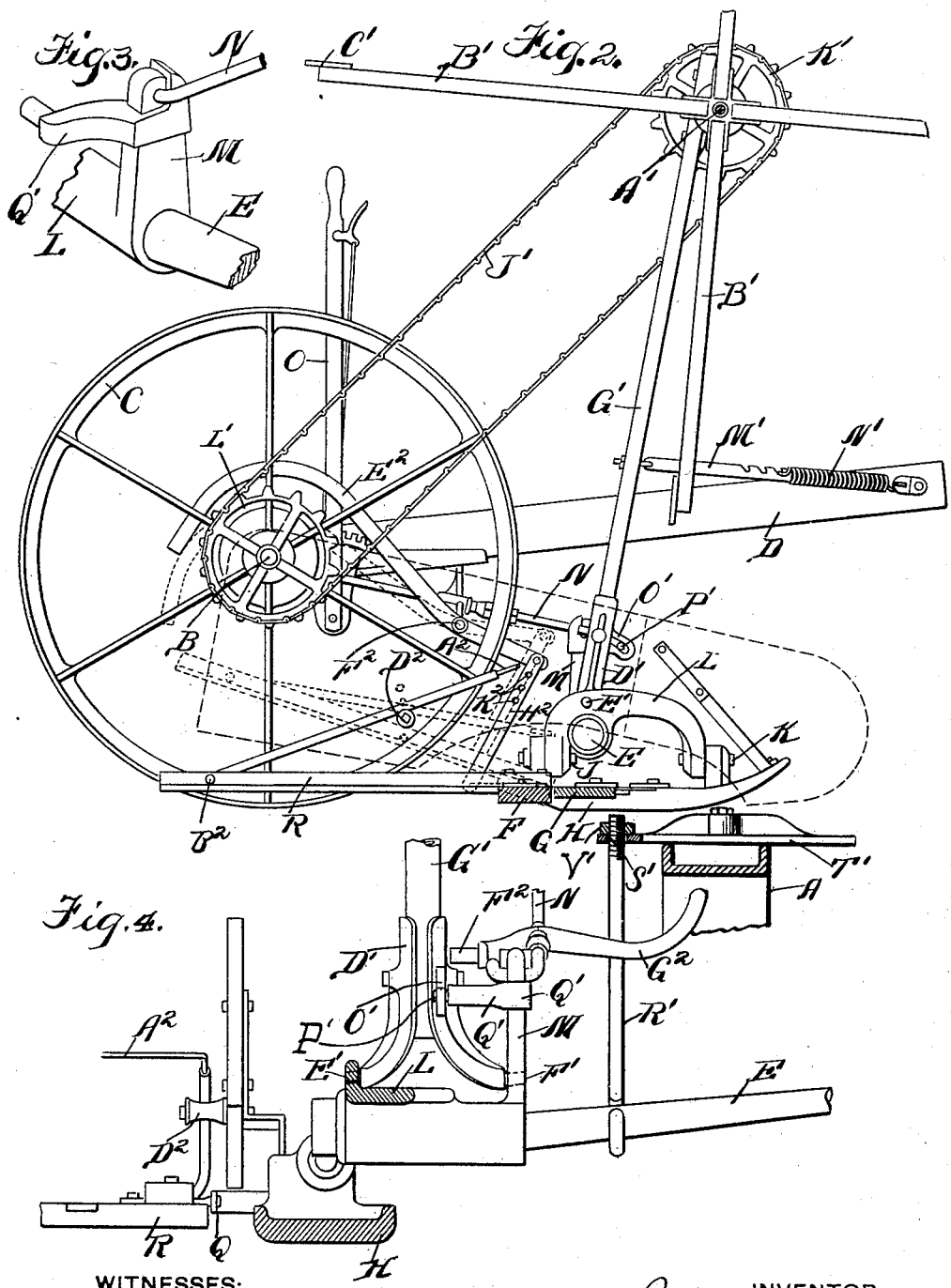

UNITED STATES PATENT OFFICE.

JAMES MACPHAIL, OF BLUE ISLAND, ILLINOIS, ASSIGNOR TO McCORMICK HARVESTING MACHINE COMPANY, OF CHICAGO, ILLINOIS, A CORPORATION OF ILLINOIS.

HARVESTER ATTACHMENT FOR MOWING-MACHINES.

SPECIFICATION forming part of Letters Patent No. 756,865, dated April 12, 1904.

Application filed May 20, 1901. Serial No. 61,046. (No model.)

*To all whom it may concern:*

Be it known that I, JAMES MACPHAIL, a citizen of the United States, residing at Blue Island, in the county of Cook and State of Illinois, have invented a new and useful Harvester Attachment for Mowing-Machines, of which the following is a specification.

This invention relates to harvester attachments for mowing-machines.

The object of the invention is to improve the construction of machines of this class in order to render the same more efficient in operation.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in plan of a mowing-machine, showing the application thereto of features embodying the principles of my invention. Fig. 2 is a view in transverse section on the line 2 2 of Fig. 1 looking in the direction of the arrows. Fig. 3 is a broken detail view in perspective of the sleeve upon which the yoke which supports the cutter-bar is supported. Fig. 4 is a broken detail view, in front elevation, parts in section, on a line in front of and parallel with the coupling-arm and embodying certain features of my invention.

The same part is designated by the same reference-sign wherever it occurs throughout the several views.

In the drawings, reference-sign A designates the frame of a mowing-machine; B, the main drive-shaft; C, the traction-wheels mounted thereon, and D the tongue.

E is a coupling-arm suitably hinged or connected in the ordinary manner at its inner end to a convenient part of the frame.

F is the cutter-supporting bar, G the cutter-bar, and H the inner shoe, hinged or pivoted, as at J K, to a yoke L, sleeved upon the end of coupling-arm E in the usual manner. Connected to the sleeve of yoke L is an arm M, to which is connected one end of a rod N, the other end of said rod being connected to a hand-lever O in the usual manner, by which a rocking movement of yoke L upon the end of coupling-arm E may be effected to tilt the front ends or points of the cutters vertically in the usual manner.

Pivotally supported, as at P Q, upon the cutter-supporting bar or frame to swing vertically, as indicated in dotted lines in Fig. 2, is a platform R, adapted to receive the grain from the cutter-bar, said frame being of the usual slatted construction. Since the cutter-bar is supported upon the yoke and the latter is sleeved upon the coupling-arm and frame R and frame R is pivotally supported upon the cutter-bar, it will be observed that tilting movements of the cutter-bar in a direction to raise or lower the points or front ends of the cutters will impart a coincident swinging movement to platform R.

Reference-sign A′ designates a reel-shaft, pivotally supported and carrying the reel-arms B′, said shaft A′ being suitably supported to bring the reel-bats C′ into proper coöperative relation with respect to the cutter.

The parts so far described may be of the usual or any well-known type or construction in the specific details thereof, and inasmuch as the present invention does not reside in such specific construction of details and arrangement further description thereof is unnecessary.

One feature of my invention resides in the manner of mounting the reel A′, and I will now describe such feature.

Reference-sign D′ designates a socket-casting pivotally mounted, as at E′ F′, upon yoke L, and in which is stepped or otherwise secured a supporting standard or tube G′. Suitably carried by said standard or tube G′ is a bearing H′, in which is journaled the reel-shaft A′, the reel-arms B′ being mounted on said shaft. Rotation is imparted to the reel-shaft A′ in any suitable manner—as, for instance, by means of a sprocket-chain J', operating over a sprocket-gear K', mounted on shaft A', and a sprocket-gear L', mounted on the main shaft B.

Pivotally connected to the supporting-standard G' is an arm or rod M', to which is adjustably connected one end of a spring N', the other end of said spring extending forwardly and being connected to the tongue D. The tension of spring N' is normally exerted to swing the standard G' and its socket-casting D' about the pivots of said socket-casting and in a direction to normally maintain the drive-chain J' taut. Since the standard G' is supported upon yoke L and the latter is sleeved to tilt upon the end of the coupling-arm, in order to raise or lower the points or front ends of the cutters it will be readily seen that the tilting of the yoke would also tilt the reel-supporting standard G', thereby causing the chain J' to become slack and also carrying the reel-bats C' too far away from the cutters. These objections are avoided in the construction shown as embodying my invention by pivotally mounting the socket-piece D' on yoke L and by the application of the spring N' to standard G', as shown and described, whereby not only is the chain J' constantly maintained taut, but also the standard G' is yieldingly pulled or rocked forwardly about its pivots E' F', whatever the tilt of the yoke axially on its bearings on the end of the coupling-arm, thereby causing the reel to automatically follow the raising and lowering movements of the points of the cutters or to accommodate itself to such movements. In order to form a guide and limit-stop for the swinging movement of supporting-standard G', said standard is provided with an ear O', having an elongated curved slot in which operates a pin P', formed on a casting or block Q', said block or casting being mounted on arm M, as most clearly shown in Fig. 3.

From the foregoing description it will be seen that the angle of inclination of the front edge of the cutter-bar may be varied, as desired, to suit the condition of the grain being harvested by tilting or rocking the yoke L upon the coupling-arm E, and the reel drive-chain J' will always be maintained in proper relation.

The next feature of my invention, which I will now describe, resides in the manner of mounting and vertically adjusting the coupling-arm E. As is customary, the inner end (not shown) of said coupling-arm is suitably connected to the framework of the machine. Arranged to engage the outer end of the coupling-arm is a supporting hook-rod R', said supporting-rod being provided with a threaded nut, as indicated at S', arranged to pass loosely through a perforation or opening in a bar T', suitably bolted or otherwise secured rigidly to the frame or tongue of the machine. A nut V', turned upon the threaded end S' and bearing upon the upper surface of bar T', serves to form a vertically-adjustable support for the outer end of the coupling-arm E, whereby the yoke L, upon which the inner end of the cutter-bar support is carried, may be vertically adjusted.

In the construction of machines of this type and character, in which is employed a rack-frame R, upon which the harvested grain is delivered from the cutters, and which frame is pivotally mounted or supported upon the cutter-bar-supporting frame, it is usual to provide means whereby when a sufficient quantity of the harvested grain has accumulated upon said frame and said frame is rocked or tilted downwardly to permit the discharge of such accumulated grain the incoming grain may not also be discharged. Means for accomplishing this result are shown comprising a bail $A^2$, having the two arms thereof pivotally connected, as at $B^2$ $C^2$, respectively, adjacent to the rear edge of the platform or rack-frame R, said arms intermediate their ends resting on rollers $D^2$, suitably and adjustably mounted in the side boards or other convenient parts of the apparatus. Thus when the rear edge or end of the rack-frame is raised to receive the incoming grain the bail or strap $A^2$ is lowered at its front edge, as indicated in dotted lines in Fig. 2; but when said rack-frame is lowered to effect a discharge of the grain accumulated thereon the front portion of the bail is raised, as shown in full lines in said figure, thereby forming a stop to prevent the incoming grain from being discharged with the accumulated grain. The tilting or swinging movements are imparted to the frame R usually by a lever suitably connected to said frame and extending into convenient position to be operated by the foot of the driver. However, since said frame is pivotally supported upon the cutter-bar support, said frame partakes of the tilting movement of said support when the lever O is actuated to rock the sleeve or yoke L about the end of the coupling-arm. The tilting in this manner of the cutter-bar support causes a corresponding change in the point of connection of the operating-lever to the frame R, thereby resulting in varying the height to which the end of said lever projects, and consequently varying the distance through which said operating-lever must be actuated to effect a proper lowering of the grain-supporting frame R to effect a discharge. It is among the purposes of my invention to provide means whereby this operating-lever always occupies the same position relative to the point at which the power is applied thereto to effect the rocking or swinging movements of the grain-supporting frame R, notwithstanding any pull that may be given to the cutter-bar support.

Referring to the drawings, reference-sign $E^2$ designates the operating-lever, through the rocking of which the grain receiving and supporting frame R is raised and lowered. This lever is arranged to extend into convenient position to be operated by the foot of the driver, as most clearly shown in Figs. 1 and 2. This lever is pivotally mounted, as at $F^2$, upon a bracket $G^2$ and is connected, by means of a link $H^2$, to an arm $J^2$, suitably bolted or otherwise secured to the grain receiving and supporting frame R at a point rearward with respect to the axis about which said frame pivots or swings. If desired, the point of connection of the lever $E^2$ to link $H^2$ may be adjustable—as, for instance, by means of a series of holes $K^2$. Now under ordinary circumstances the tilting of the bar F, upon which frame R is pivoted, as when the sleeve of yoke L is rocked about the end of the coupling-arm, would rock or tilt operating-lever $E^2$ about its pivot, and hence vary the height of the operating end of said lever $E^2$, and consequently instituting a variation in the degree to which said end is depressed by the foot of the operator according to the degree of tilt given the cutter-bar support. In order to overcome this objection, I arrange the fulcrum-point $F^2$ to be movable coincidently with the rocking of the sleeve of the yoke upon the coupling-arm. This result is attained by loosely mounting the bracket $G^2$ upon the rod N, a nut or shoulder on said rod N being arranged to engage said bracket, so that whenever said rod is projected under the influence of the operating hand-lever O to tilt the yoke L on the coupling-arm the bracket $G^2$, and consequently the fulcrum-point $F^2$ of lever $E^2$, which is carried thereby, is correspondingly shifted or moved, thus preserving said lever $E^2$ in uniform relation to the foot of the operator, whatever the degree of tilt imparted to the yoke. A convenient arrangement is shown wherein bracket $G^2$ has a sliding bearing (see Fig. 4) against the under surface of a portion of the frame of the machine. By this construction it will be seen that not only is the operating end of lever $E^2$ preserved in uniform position with reference to the foot of the operator, but the danger is avoided of unduly raising the stop-strap $A^2$ by the shifting of the relative pivotal point or connection of lever $E^2$ to the grain-receiving frame R by the tilting of said lever $E^2$ about its fulcrum-point.

Many variations and changes in the details of construction and arrangement would readily suggest themselves to persons skilled in the art and still fall within the spirit and scope of my invention. I do not desire, therefore, to be limited or restricted to the exact details shown and described; but, Having now set forth the object and nature of my invention and a construction embodying the principles thereof, what I claim as new and useful and of my own invention, and desire to secure by Letters Patent of the United States, is—

1. In a harvester attachment for mowing-machines, a cutter-bar, a yoke upon which said bar is carried, and means for rocking said yoke to tilt the cutter-bar, in combination with a reel-support pivotally mounted upon said yoke, a reel carried by said reel-support, drive-gearing for said reel, and means connected with said pivotally-mounted reel-support whereby the rocking movement of said yoke is permitted without deranging the drive-gearing for said reel, as and for the purpose set forth.

2. In a harvester attachment for mowing-machines, a cutter-bar, a yoke upon which said bar is mounted, and means for rocking said yoke to tilt the cutter-bar, in combination with a reel-support pivotally mounted upon said yoke and carrying a reel, gearing for driving said reel, and a spring connected to the reel-support, as and for the purpose set forth.

3. In an apparatus of the class described, a main frame and axle, a cutter, a tilting support therefor, a standard pivotally mounted on said support, a reel carried by said standard, gearing actuated by said axle for driving said reel, and means for imposing a yielding tension upon said standard, as and for the purpose set forth.

4. In an apparatus of the class described, a coupling-arm, a yoke sleeved upon said arm, a cutter-bar carried by said yoke, means for tilting said yoke about said coupling-arm, a standard pivotally supported upon said yoke, a reel carried by said standard, gearing for actuating said reel, and a spring arranged to exert its tension upon said standard, as and for the purpose set forth.

5. In an apparatus of the class described, a cutter-bar, a yoke supporting the same, means for rocking said yoke to vary the tilt of said cutter-bar, a standard pivotally connected to said yoke, a reel carried by said standard, means for driving said reel, and a spring tension imposed upon said standard, as and for the purpose set forth.

6. In an apparatus of the class described, a cutter-bar, a yoke supporting said bar, means for tilting said yoke, a standard pivotally connected to said yoke, a reel carried by said standard, means for actuating said reel, and a spring adjustably connected to said standard to impose a yielding tension thereon, as and for the purpose set forth.

7. In an apparatus of the class described, a main frame, a main axle and traction-wheel mounted thereon, a cutter-bar, a yoke upon which said cutter-bar is mounted, means for tilting said yoke, a standard pivotally supported upon said yoke, a reel-shaft and reel mounted on said standard, a sprocket-chain operating over a sprocket on said reel-shaft and extending rearwardly therefrom to a sprocket on said main axle, and a spring connected to said standard and extending forwardly therefrom and connected to the frame, as and for the purpose set forth.

8. In an apparatus of the class described, a yoke, a cutter-bar supported thereon, an arm connected with said yoke, means engaging said arm for rocking said yoke, a standard pivotally mounted upon said yoke and provided with a slotted ear, a projection carried by said arm arranged to operate in the slot in said ear, a reel-shaft journaled upon said standard, a reel mounted upon said shaft, gearing for driving said shaft, and a spring connected at one end to said standard and at the other end to the frame of the machine; all combined and arranged as and for the purpose set forth.

9. In an apparatus of the class described, a cutting mechanism, a receiving-platform pivotally supported upon the frame of said cutting mechanism, a lever connected to said platform to tilt the same relatively to said cutting mechanism, means for tilting said cutting mechanism, and means for correspondingly shifting the fulcrum of said lever, as and for the purpose set forth.

10. In an apparatus of the class described, a cutting mechanism, a supporting-frame therefor, means for tilting said supporting-frame to vary the angle of inclination of said cutting mechanism, a receiving-platform pivotally mounted upon said supporting-frame, a pivotally-mounted lever connected to said receiving-platform for tilting said receiving-platform, and means actuated coincidently with the tilting of said supporting-frame for shifting the fulcrum of said lever, as and for the purpose set forth.

11. In an apparatus of the class described, a cutting mechanism, a supporting-frame therefor, a rocking support for said frame, a rod for rocking said support, a receiving-platform pivotally mounted upon said supporting-frame, a pivoted lever connected to said platform, and connections between the pivot of said lever and said actuating-rod whereby when the latter is operated to tilt said cutting mechanism the fulcrum of said lever is correspondingly shifted, as and for the purpose set forth.

12. In an apparatus of the class described, a cutting mechanism, a supporting-frame therefor, a rod connected to said supporting-frame for tilting the same, a bracket connected to move with said rod, and carrying a pivot-stud, a lever fulcrumed upon said pivot-stud, a grain-receiving frame pivotally supported upon said cutter-mechanism-supporting frame, and a link pivotally connected at one end to said receiving-platform and at the other end to said lever, as and for the purpose set forth.

In witness whereof I have hereunto set my hand, this 15th day of May, 1901, in the presence of the subscribing witnesses.

JAMES MACPHAIL.

Witnesses:
E. C. SEMPLE,
S. E. DARBY.